United States Patent
Nohno et al.

(10) Patent No.: US 8,045,003 B2
(45) Date of Patent: Oct. 25, 2011

(54) ONBOARD DISPLAY DEVICE, VEHICLE, DISPLAY METHOD, IMAGE DISPLAY PROGRAM AND RECORDING MEDIUM

(75) Inventors: Hitoshi Nohno, Nabari (JP); Megumi Itoh, Nara (JP); Toshiya Takahashi, Soraku-gun (JP); Takeshi Yamamoto, Soraku-gun (JP); Aki Miake, Nara (JP); Mitsukazu Okuda, Ikoma (JP); Takeshi Doi, Kashiwara (JP)

(73) Assignee: Sharp Kabushiki Kaisha, Osaka (JP)

( * ) Notice: Subject to any disclaimer, the term of this patent is extended or adjusted under 35 U.S.C. 154(b) by 1469 days.

(21) Appl. No.: 10/598,090

(22) PCT Filed: Feb. 18, 2005

(86) PCT No.: PCT/JP2005/003088
§ 371 (c)(1),
(2), (4) Date: Aug. 17, 2006

(87) PCT Pub. No.: WO2005/080135
PCT Pub. Date: Sep. 1, 2005

(65) Prior Publication Data
US 2007/0273638 A1    Nov. 29, 2007

(30) Foreign Application Priority Data
Feb. 20, 2004   (JP) .................................. 2004-045469

(51) Int. Cl.
*H04N 7/18*    (2006.01)
*H04N 5/225*    (2006.01)
*G06K 9/00*    (2006.01)
*G09G 5/00*    (2006.01)

(52) U.S. Cl. .................. 348/148; 348/207.99; 382/154; 345/1.1

(58) Field of Classification Search .................. 345/156; 348/148
See application file for complete search history.

(56) References Cited

U.S. PATENT DOCUMENTS 5,764,139 A    6/1998    Nojima et al.
(Continued)

FOREIGN PATENT DOCUMENTS

| EP | 1 065 642 A2 | 1/2001 |
| EP | 1 400 410 A2 | 3/2004 |
| JP | 10-257482 A | 9/1998 |
| JP | 11-099879 A | 4/1999 |

(Continued)

OTHER PUBLICATIONS

International Search Report issued in the corresponding International Application No. PCT/JP2005/000388, mailed on May 31, 2005.

*Primary Examiner* — Christopher S Kelley
*Assistant Examiner* — Hee-Yong Kim
(74) *Attorney, Agent, or Firm* — Keating & Bennett, LLP

(57) ABSTRACT

A display screen of an onboard display device is disposed so that a speedometer is displayed in front of a driver of a vehicle. When a right-turn instruction is detected, a blinker is displayed and a rightward rear view image outside the vehicle is displayed on the right side of the display screen. When a left-turn instruction is detected, a blinker is displayed and a leftward rear view image outside the vehicle is displayed on the left side of the display screen. Displaying the image in different positions of the display screen according to the right or the left turn instruction facilitates an intuitive determination of a meaning of the image and makes it easier to drive the vehicle.

10 Claims, 5 Drawing Sheets

U.S. PATENT DOCUMENTS

| | | | |
|---|---|---|---|
| 5,926,153 A * | 7/1999 | Ohishi et al. | 345/1.1 |
| 7,366,595 B1 | 4/2008 | Shimizu et al. | |
| 2001/0028393 A1* | 10/2001 | Tomida et al. | 348/207 |
| 2003/0137586 A1* | 7/2003 | Lewellen | 348/148 |
| 2004/0208358 A1* | 10/2004 | Tooyama et al. | 382/154 |
| 2006/0287825 A1 | 12/2006 | Shimizu et al. | |
| 2006/0287826 A1 | 12/2006 | Shimizu et al. | |

FOREIGN PATENT DOCUMENTS

| | | | |
|---|---|---|---|
| JP | 2001-006097 A | | 1/2001 |
| JP | 2001-039217 A | | 2/2001 |
| JP | 09-123848 A | | 4/2001 |
| JP | 2001-105973 A | | 4/2001 |
| JP | 2003-16595 | * | 1/2003 |
| JP | 2003-016595 A | | 1/2003 |

* cited by examiner

ONBOARD DISPLAY DEVICE, VEHICLE, DISPLAY METHOD, IMAGE DISPLAY PROGRAM AND RECORDING MEDIUM

BACKGROUND OF THE INVENTION

1. Field of the Invention

The present invention relates to an onboard display device mounted on a vehicle, a vehicle, a display method, an image display program, and a recording medium.

2. Description of the Related Art

A vehicle is provided with an instrument panel for indicating driving conditions of the vehicle.

Recently, an arrangement has been proposed in which a display device is provided on the instrument panel so as to display on the display device an image captured by a camera mounted on a vehicle. In this arrangements, content to be indicated on the instrument panel such as content of a speedometer can be displayed on a screen of the display device. For example, if a rear view image of the vehicle is displayed on the screen, it is possible to check an area at the rear of the vehicle without looking away from the front. This makes it easier to drive the vehicle.

For example, Japanese publication of Patent Application 123848/1997 (Tokukaihei 9-123848; published on May 13, 1997) discloses an arrangement in which a display device displays thereon a rear view image of a side on which a blinker is turned so as to indicate that the vehicle is to turn to the side (cf. Paragraph [0033], FIG. 16, etc.). In this arrangement, rightward and leftward rear view images are respectively displayed on a right side of a display area of a wide display regardless of which direction a driver is looking when driving.

Further, Japanese publication of Patent Application 257482/1998 (Tokukaihei 10-257482; published on Sep. 25, 1998) discloses an arrangement in which a rear view image is displayed at all times on a screen.

Further, Japanese publication of Patent Application 39217/2001 (Tokukai 2001-39217; published on Feb. 13, 2001) discloses a monitor for displaying rightward and leftward rear view images in accordance with a direction in which a driver is looking, in an arrangement in which a display device is mounted at a location other than an instrument panel (cf. the Embodiments and FIGS. 1 and 2, etc.).

However, the foregoing arrangements have a problem in that the rear view images captured by a camera, for example, are not sufficiently distinguishable as to whether they are a rightward rear view image or a leftward rear view image. Therefore, even if the sideward (i.e., rightward or leftward) rear view image is displayed, this does not ensure that the driving of the vehicle becomes easy.

Specifically speaking, the arrangements in which an image captured by the camera is displayed on a screen aims to make it easier to drive the vehicle by supplying image information via the image. However, for the following reasons, these arrangements do not ensure that the driving of the vehicle becomes easy. In some cases, these arrangements may make it difficult to drive the vehicle.

In the arrangement of Japanese publication of Patent Application 123848/1997 (Tokukaihei 9-123848), a driver may not be able to distinguish at a glance whether the rear view image is a rightward rear view image or a leftward rear view image.

In the arrangement of Japanese publication of Patent Application 257482/1998 (Tokukaihei 10-257482), because a rear view image is displayed at all times on the screen, a moving image always comes into sight of a driver. This may cause a problem in maneuvering the vehicle, and is not preferable for the sake of safe driving.

Further, in the arrangement of Japanese publication of Patent Application 39217/2001 (Tokukai 2001-39217), display devices are disposed respectively in positions near mirrors, i.e., at a distance from an instrument panel. That is, a right monitor and a left monitor are respectively disposed in positions remote from the instrument panel. Also, the monitors cannot display another kind of driving information. This may cause a problem of whether it becomes easy to check an image and whether driving of the vehicle can become easier.

SUMMARY OF THE INVENTION

In order to overcome the problems described above, preferred embodiments of the present invention provide an onboard display device, a vehicle, a display method, an image display program, and a recording medium, which make it easier to drive a vehicle.

According to a preferred embodiment of the present invention, an onboard display device is an onboard display device mounted on a vehicle for displaying an image in accordance with image data inputted from an image capture section, which captures an image outside of the vehicle, the onboard display device including a display control section which, upon receipt of an image display instruction for checking a rightward or leftward outside area of the vehicle, causes a screen of the display device to start displaying a rightward outside view image for checking a rightward outside area of the vehicle or a leftward outside view image for checking a leftward outside area of the vehicle, the image display instruction being inputted from the vehicle, and the rightward outside view image and leftward outside view image being captured by the image capture section; and an image processing section for causing a manner in which the rightward outside view image is displayed to be different from a manner in which the leftward outside view image is displayed.

The display device is preferably mounted on a vehicle. The display device displays, on the screen, imaged at a inputted from the image capture section. Here, the image data is, for example, real-time moving image data. However, the image data is not to be limited to this and may be, for example, static image data so that a static image is displayed such that it is changed at a predetermined period of time.

The display device displays on the screen of the display control section an image for use in checking a rightward rear or leftward rear (hereinafter collectively referred to as a rear) of the vehicle, captured by the image capture section, according to an image display instruction inputted from the vehicle. Here, an arbitrary operation such as a right-turn instruction and a left-turn instruction by way of a blinker may be an operation triggering an image display instruction from the vehicle.

When a triggering operation is selected, an image display instruction is inputted from the vehicle into the onboard display device. The display control section of the display device starts to display an image for checking the rear area of the vehicle (i.e., rightward outside view image or leftward outside view image) upon receipt of the image display instruction. Further, the display control section stops displaying the image for checking the rear area of the vehicle (i.e., rightward outside view image or leftward outside view image) when input of the image display instruction is stopped. The rightward and leftward rear areas are an area extending from a side position of the vehicle to a rear position of the vehicle.

That is, the display device displays an image that is captured only when receiving an image display instruction and does not always display the image. This means that an unnecessary moving image or the like is not displayed on the display screen. This avoids hindering the driving and rendering the display less user-friendly.

Here, in view of safe driving, it is not preferable that a moving image be displayed in the sight of a driver. However, a moving image which is preferable for the purpose of safety and whose content can be predicted by a driver (e.g., the content displayed in a side mirror) may be regarded as necessary. Accordingly, such an image is not displayed at all times during the driving but only when necessary. The prior art has not recognized the importance of not displaying something other than that which is necessary for the sake of safe driving.

Further, because other information can be displayed when an image that is captured is not displayed, more information can be displayed as a result. That is, more of other information can be displayed when the image that is captured is not displayed.

Further, the image processing section of the display device causes a manner in which the rightward outside view image is displayed to be different from a manner in which the leftward outside view image is displayed.

If the display manners in which the rightward outside view image and the leftward outside view image are displayed are different, it is possible to judge from the display manner on the screen whether the rightward outside view image or the leftward outside view image is displayed. This enables an intuitive determination of the situation and makes it easier to drive the vehicle. Further, because only an outside view image on a necessary side is displayed and an unnecessary portion of a moving image is not displayed, a driver will not be confused. This contributes to safe driving.

For example, the display manners may be differentiated by using different configurations on the screen, different frame shapes of display areas of the image on the screen, different frame colors, different background colors, or another property of the display. Further, the frame of display area of the image may blink. Moreover, the display manner in which the images are displayed may be varied according to a speed of the vehicle.

Further, according to another preferred embodiment of the present invention, an onboard display device is an onboard display device mounted on a vehicle for displaying an image in accordance with image data inputted from an image capture section, which captures an image outside of the vehicle, the onboard display device including a display control section which (i) enables displaying on a screen any one of an image for checking a rightward outside area and an image for checking a leftward outside area of the vehicle, and (ii) upon receipt of an image display instruction for checking rightward or leftward outside of the vehicle, causes one of the image for checking the rightward outside area or the image for checking the leftward outside area to be displayed, the image display instruction being inputted from the vehicle, and the rightward outside view image and leftward outside view image being captured by the image capture section; and an image processing section, which causes the display of the rightward outside view image and the leftward outside view image to be performed such that a manner in which the rightward outside view image is displayed is caused to be different from a manner in which the leftward outside view image is displayed.

The display device is preferably mounted on a vehicle. The display device displays, on the screen, image data inputted from the image capture section. Here, the image data is, for example, real-time moving image data. However, the image data is not to be limited to this and may be, for example, static image data so that a static image is displayed in such that it is changed at a predetermined period of time.

The display device displays on the screen of the display control section an image for use in checking a rightward rear or leftward rear (hereinafter collectively referred to as a rear) of the vehicle, captured by the image capture section, according to an image display instruction inputted from the vehicle. Either of the images for checking the rear area of the vehicle is selected and displayed on a screen of the onboard display device. Here, an arbitrary operation such as a right-turn instruction and a left-turn instruction by way of a blinker may be an operation triggering an image display instruction from the vehicle.

When a triggering operation is selected, an image display instruction is inputted from the vehicle into the onboard display device. The display control section of the display device starts to display an image for checking the rear area of the vehicle (i.e., rightward outside view image or leftward outside view image) upon receipt of the image display instruction. Further, the display control section stops displaying the image for checking the rear area of the vehicle (i.e., rightward outside view image or leftward outside view image) when input of the image display instruction is stopped. The rightward and leftward rear areas are an area extending from a side position of the vehicle to a rear position of the vehicle.

That is, the display device displays only when receiving an image display instruction and does not always display an image that is captured. This means that an unnecessary moving image, or the like, is not displayed on the display screen. This avoids hindering the driving and rendering the display less user-friendly.

Here, in view of safe driving, it is not preferable that a moving image be displayed in the sight of a driver. However, a moving image which is preferable for the purpose of safety and whose content can be predicted by a driver (e.g., the content displayed in a side mirror) may be regarded as necessary. Accordingly, such an image is not displayed at all times during the driving but only when necessary.

Further, because other information can be displayed when an image that is captured is not displayed, more information can be displayed as a result.

That is, more other information can be displayed when the image that is captured is not displayed.

Further, the image processing section of the display device causes a manner in which the rightward outside view image is displayed to be different from a manner in which the leftward outside view image is displayed.

If the display manners in which the rightward outside view image and the leftward outside view are displayed are different, it is possible to judge from the display manner on the screen whether the rightward outside view image or the leftward outside view is displayed. This enables an intuitive determination of the situation and makes it easier to drive the vehicle. Further, because only an outside view image on a necessary side is displayed and an unnecessary portion of a moving image is not displayed, a driver will not be confused. This contributes to safe driving.

For example, the display manners may be differentiated by using different configurations on the screen, different frame shapes of display areas of the image on the screen, different frame colors, different background colors, or other properties of the display. Further, the frame of display area of the image may blink. Moreover, the display manner in which the images are displayed may be varied according to a speed of the vehicle.

According to another preferred embodiment of the present invention, a display method is a display method for displaying an image on an onboard display device mounted on a vehicle, the display method including the steps of detecting an image display instruction given to the onboard display device for checking a rightward or leftward outside area of the vehicle; causing a screen of the onboard display device to start displaying an image upon detection of the image display instruction in the detecting step; and causing a manner in which the rightward outside view image is displayed to be different from a manner in which the leftward outside view image is displayed.

The onboard display device according to the present preferred embodiment can be achieved by performing the display method in the onboard display device.

According to another preferred embodiment of the present invention, the display method is a display method of an onboard display device mounted on a vehicle provided with one or more image capture devices capable of capturing images for checking a rightward and leftward rear areas, which can display the images for checking the rightward and leftward rear areas within a screen, the display method including the steps of detecting an instruction for displaying a rightward outside view image for checking a rightward outside area of the vehicle or a leftward outside view image for checking a leftward outside area of the vehicle; and selecting and displaying either a rightward outside view image for checking a rightward outside area of the vehicle or a leftward outside view image for checking a leftward outside area of the vehicle according to a detection result in the detecting step.

The onboard display device according to the present preferred embodiment can be achieved by performing the display method in the onboard display device.

According to another preferred embodiment of the present invention, an onboard display device is an onboard display device mounted on a vehicle for displaying on a screen of the display device image data inputted from an image capture section, which captures an image of outside of the vehicle, the onboard display device including: a display control section which, upon receipt of an image display instruction for checking a rear area of the vehicle, causes a screen of the display device to start displaying either a rightward outside view image for checking a rightward outside area of the vehicle or a leftward outside view image for checking a leftward outside area of the vehicle based on a type of the instruction signal thus received, the image display instruction being outputted from the vehicle, and the rightward outside view image and the leftward outside view image being captured by the image capture section; and an image processing section for causing the display of the rightward outside view image and the leftward outside view image to be performed such that a manner in which the rightward outside view image is displayed is caused to be different from a manner in which the leftward outside view image is displayed.

According to another preferred embodiment of the present invention, an onboard display device is an onboard display device mounted on a vehicle for displaying, on a screen of the display device, image data inputted from an image capture section, which captures an image of outside of the vehicle, the onboard display device including a display control section which, upon receipt of an image display instruction for checking a rear area of the vehicle, causes a screen of the display device to start displaying either a rightward outside view image for checking a rightward outside area of the vehicle or a leftward outside view image for checking a leftward outside area of the vehicle in accordance with a type of the instruction signal so received, the image display instruction being outputted from the vehicle, and the rightward outside view image and the leftward outside view image being captured by the image capture section; and an image processing section for causing a display layout including (a1) image indicating information on the vehicle, and (a2) the rightward outside view image to be displayed in a display manner different from that in which a display layout including (b1) image indicating information on the vehicle, and (b2) the leftward outside view image is displayed.

For a fuller understanding of the nature and advantages of the present invention, reference should be made to the ensuing detailed description taken in conjunction with the accompanying drawings.

Other features, elements, steps, characteristics and advantages of the present invention will become more apparent from the following detailed description of preferred embodiments of the present invention with reference to the attached drawings.

DETAILED DESCRIPTION OF PREFERRED EMBODIMENTS

Figure 1A:
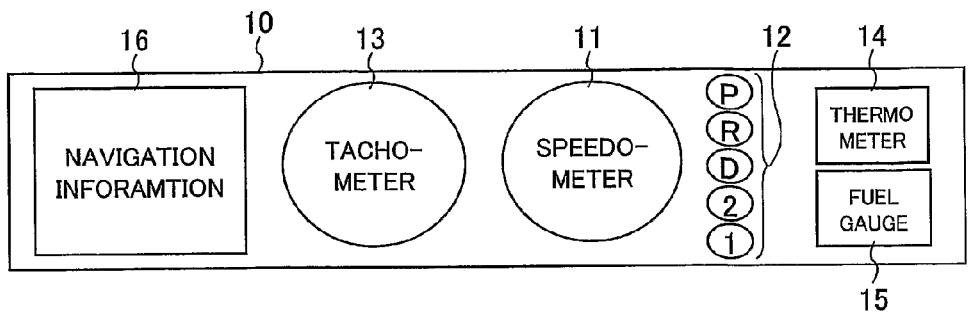
FIG. 1A is a plan view showing a display example by an onboard display device according to a preferred embodiment of the present invention.

Preferred embodiments of the present invention will be described below with reference to FIGS. 1A to 6C. As illustrated in FIG. 2, a display device of the present preferred embodiment is preferably mounted on an automobile (vehicle) 1.

As illustrated in FIG. 2, the automobile 1 includes a maneuvering section 2, a control section 3, an image capture section 4, a display device 5, a sensor 6, and a transmitter-receiver section 7.

The maneuvering (operating) section 2 detects a maneuver (operation) performed by a user so as to maneuver (operate) the automobile 1. The maneuvering section 2 includes a steering wheel 2a, a brake 2b, an accelerator 2c, a blinker switch (direction indicating device) 2d, and an image selection switch (rightward-and-leftward check switch) 2e. The steering wheel 2a, the brake 2b, and the accelerator 2c are a steering wheel, a brake, and an accelerator which are used to maneuver the automobile 1. The blinker switch 2d is a switch which switches ON/OFF a blinker (indicator) for indicating whether the vehicle is to turn right or left. The image selection switch 2e is a switch for outputting, to the display device 5 through the control section 3, an image display instruction for a rightward or leftward check, i.e., for checking the rightward area or the leftward area of the vehicle (the term "rightward area" encompasses an area including a right side area and a rightward rear area of the vehicle, and the term "leftward area" encompasses an area including a left side area and leftward rear area of the vehicle). The image selection switch 2e of the present preferred embodiment is provided near the steering wheel (a steering wheel 2a).

The control section 3 controls various parts of the automobile 1 so as to perform overall control of the automobile 1.

Figure 3:
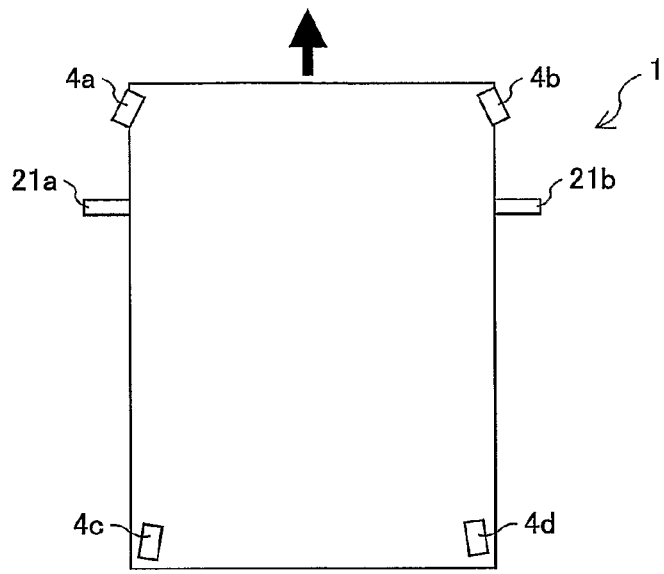
FIG. 3 is a schematic plan view of the vehicle.

The image capture section 4 captures an image of the surrounding area of the vehicle. The image capture section 4 inputs, into the display device 5 through the control section 3, image data obtained by way of the image produced by the image capture section 4. As illustrated in FIG. 3, the image capture section 4 preferably has cameras 4a to 4d at various locations of the automobile 1.

The camera 4a is disposed on a forward and leftward portion of the automobile 1 with respect to a forward direction D thereof (i.e., a direction in which the automobile 1 moves when driving forward). The camera 4a is preferably disposed, e.g., on a forward portion of a left side or a leftward portion of a front of the automobile 1. The camera 4a can capture an image of an area in a blind spot of a side mirror 21a. The camera 4b is disposed on a forward and rightward portion of the automobile 1 with respect to the forward direction D thereof. The camera 4b is preferably disposed, e.g., on a forward portion of a right side or a rightward portion of a front of the automobile 1. The camera 4b can capture an image of an area in a blind spot of a side mirror 21b.

The camera 4c is disposed on a backward and leftward portion of the automobile 1 with respect to the forward direction D thereof. The camera 4c is preferably disposed, e.g., on a backward portion of a left side or a leftward portion of a rear of the automobile 1. The camera 4c can capture an image of a backward area including an area right behind the automobile 1. The camera 4d is disposed on a backward and rightward portion of the automobile 1 with respect to the forward direction D thereof. The camera 4c is disposed, e.g., on a backward portion of a right side or a rightward portion of a rear of the automobile 1. The camera 4d can capture an image of a backward area including an area right behind the automobile 1.

The cameras 4a and 4c are, e.g., leftward-view image-capture cameras which capture an image (leftward outside view image) of a leftward surrounding area (leftward rear area and leftward area) of the automobile 1 with respect to the forward direction D. The cameras 4b and 4d are rightward-view image-capture cameras which capture an image (rightward outside view image) of a rightward surrounding area (rightward rear area and rightward area) of the automobile 1 with respect to the forward direction D. As illustrated in FIG. 3, the rightward surrounding area is an area including a rightward rear area and a rightward area of the automobile 1, whereas the leftward surrounding area is an area including a leftward rear area and a leftward area of the automobile 1.

The automobile 1 of the present preferred embodiment has the cameras 4a to 4d included in and defining the image capture section 4. For instance, an image captured as a rightward rear view image or a leftward rear view image is displayed on the image display device 5, the rightward rear view image captured by the camera 4b or the camera 4d, and the leftward rear view image captured by the camera 4a or the camera 4c. For instance, the image is switched over by the driver.

The image capture section 4 of the automobile 1 is not limited to this arrangement. For example, the automobile 1 may include only the cameras 4a and 4b, or only the cameras 4c and 4d. For example, when the automobile 1 is already provided with the camera 4a due to a mandate by a law or a regulation, the camera 4b only needs to be further installed in order to achieve this arrangement. This is advantageous in terms of cost.

Further, for example, images captured by the cameras 4a and 4c may be arranged so as to display on the display device 5 an image of an area larger than that shown on the left side mirror 21a. Further, images captured by the camera 4b and 4d may be arranged so as to display on the display device 5 an image of an area larger than that shown on the right side mirror 21b.

The display device 5 displays image data inputted from the image capture section 4 which captures an image of the surroundings of the vehicle. The display device 5 of the present preferred embodiment is preferably a liquid-crystal display device, for example. The display device 5 will be described later.

The sensor 6 is preferably a sensor for detecting whether or not an object is present around the vehicle. The sensor 6 of the present preferred embodiment emits ultrasonic waves in a predetermined direction and receives reflections of the ultrasonic waves so as to detect whether or not an object is present around the vehicle. An arrangement of the sensor 6 is not limited to this. For example, the sensor 6 may perform an image processing and image abstraction with respect to an image captured by the image capture section 4, so as to judge whether or not an object is present around the vehicle. For example, it is judged that a two-wheeled vehicle is present around the vehicle if an image of the two-wheeled vehicle is abstracted from a captured image. If not, it is judged that there is no two-wheeled vehicle around the vehicle.

Further, the automobile 1 is provided with another plurality of sensors (not illustrated). The sensors respectively measure data such as a speed of the automobile 1, a number of engine revolutions (RPM), a status of a shift lever, a temperature of cooling water, and a remaining amount of fuel (hereinafter, these data are referred to as driving information collectively). The sensors send the data to the control section 3. The control section 3 outputs the inputted data to the display device 5 so as to cause the display device 5 to display the inputted data thereon.

The transmitter-receiver section 7 functions as a navigation information transmitting and receiving section which obtains information, sent from a navigation information transmitting station 30, on a position of the vehicle. The transmitter-receiver section 7 functions as a navigation information transmitting and receiving section, which is used to obtain a vehicle position information (i.e., information regarding where the vehicle is) by communicating with a navigation information transmitting station 30.

The use of a navigation system makes it possible to search for an optimum route by inputting a place of departure and a destination. In the use of the navigation system, an image display instruction is outputted to the display device 5, for example, according to a position of the vehicle so that a rightward rear view image on the display device 5 at a position located at a predetermined distance before an intersection where a right turn is to be made on the optimum route. The same applies in the case of a left turn. This makes it possible to display a rear view image on a screen of the image display device 5 before making a right turn or a left turn, thereby making it easier to drive the vehicle.

Here, the display device 5 of the present preferred embodiment will be described. The display device 5 is an FPD (Flat Panel Display device) used in lieu of an instrument panel.

As illustrated in FIG. 2, the display device 5 includes a controller (display control section) 8a, an input section 8b, an image processing device (image processing section) 9, and a display panel (screen) 10.

The controller 8a controls the display device 5. More specifically, the controller 8a receives data and outputs the data to the display panel 10 through the image processing device 9 so as to display the inputted data on the display panel 10. For example, the controller 8a receives speed data of the automobile 1 from a sensor (not shown), and causes the display panel 10 to display the speed data thereon.

Further, the controller 8a, upon receiving from the control section 3 an instruction for displaying an image for use in checking a rightward rear or leftward rear (hereinafter collectively referred to as a rear) of the vehicle, causes the display panel 10 to display image data for checking the rear area of the vehicle; the image data being captured by the cameras 4a, 4b, 4c and 4d of the image capture section.

The input section 8b is a user interface of the display device 5. The input section 8b is used to adjust and control display conditions of the screen of the display device 5. For example, the input section 8b can be used to instruct and control the display panel 10 to mirror-reverse the image for use in checking the rear.

The image processing device 9 performs image processing to image data inputted therein. The image processing may be, for example, mirror-reverse processing and a change in a display position of the contents. For example, when the input section 8b detects an instruction for mirror-reversing the image for checking the rear, the image processing device 9 mirror-reverses image data captured by the image capture section 4, and then outputs the thus mirror-reversed image data.

Further, the image processing device 9 processes image data for checking a rear area inputted from the controller 8a so as to display an image of the image data in different display manners depending on whether the image data is for checking a rightward or a leftward rear of the automobile 1. For example, the image processing device 9 causes the image of the image data to be displayed in different positions depending on whether the image data is for checking the rightward or the leftward rear. When the image of the image data is displayed in different positions, areas in which images for indicating various driving information (i.e., gauge-like images) are displayed are changed by the image processing device 9.

The display panel 10 is a display panel for displaying image data. The display panel 10 preferably has an aspect ratio (which is a ratio indicating a ratio of a height and width of a display area) of 7:3 or more, for example. That is, it is longer in width than in height. This makes it easier to watch an additional image such as a navigation image and a vehicle condition image indicating vehicle conditions such as a speed of the vehicle and an amount of fuel remaining in the vehicle when these images are displayed together on the display panel 10. Further, more specifically, an aspect ratio of 8:3, 30:9, or 32:9 can be used, for example. Therefore, the display panel 10 may include two or more display panels which respectively have aspect ratios of 4:3, 15:9, or 16:9. The display panel 10 of the present preferred embodiment is preferably a wide-area liquid crystal display panel but is not limited to this. For example, the display panel 10 may be a plasma display device, an organic or inorganic EL (electroluminescence) panel, a CRT (Cathode Ray Tube), or a display device of other types.

The display panel 10 of the display device 5 will be described with reference to FIGS. 1A to 1C.

Figure 2:
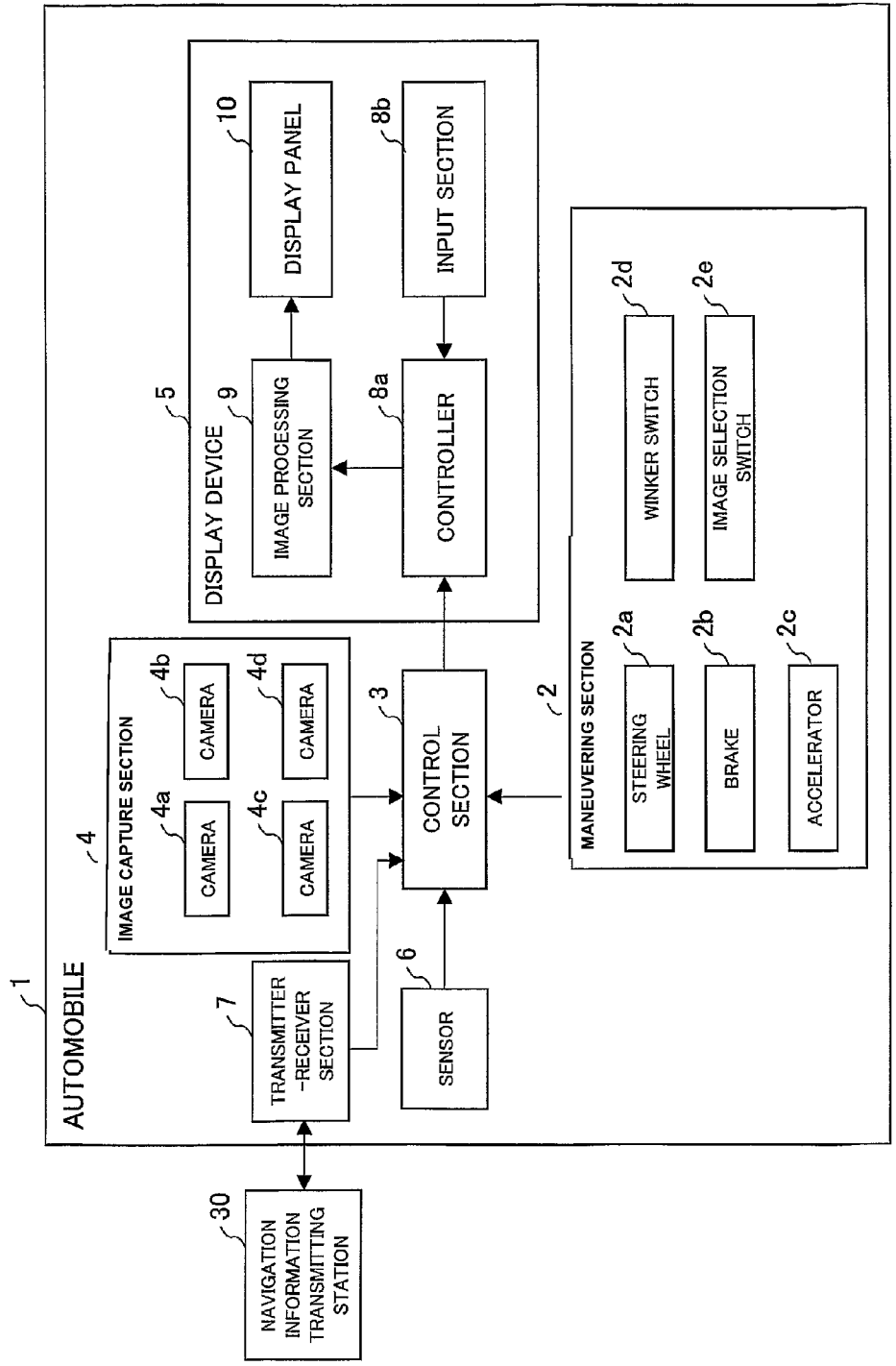
FIG. 2 is a block diagram showing an example of an arrangement of a vehicle provided with a display device.

As illustrated in FIG. 1A, the display device 5 displays on the display panel 10 driving information images (images to indicate driving information, i.e., gauge-like images) such as, a speedometer 11, a gear status (status of the shift lever) 12, a tachometer 13, a thermometer 14, a fuel gauge 15, and navigation information 16. An image for checking the rear area of the vehicle is not displayed on the display panel 10 in a normal state.

The speedometer 11 displays speed detected by a sensor (not shown) of the automobile 1. The speed may be displayed in an analog form (in which the speed is indicated by an image of a measuring instrument) or in a digital form (in which the speed is indicated numerically). Similarly, the gear status 12, the tachometer 13, the thermometer 14, and the fuel gauge 15 respectively display a status of the shift lever, a number of engine revolutions per minute (RPM), a temperature of cooling water, and a remaining amount of fuel, which are detected by respective sensors (not shown). The speedometer 11 of the display panel 10 of the present preferred embodiment is fixedly displayed in front of a driver of the automobile 1. This makes it easy to check the speedometer 11, which needs to be frequently looked at during driving. The present invention is not limited to the instrument images displayed on the display panel 10 of the display device 5 in this arrangement; the driving information may be displayed in, e.g., other forms of measuring instrument images, or some of the measuring instruments may not be displayed.

Suppose, in the automobile 1 of the foregoing arrangement, that a driver turns on the image selection switch 2e of the maneuvering section 2 in order to check a rightward rear of the vehicle before making a right turn. This causes an image display instruction for a rightward check to be outputted to the display device 5 from the image selection switch 2e through the control section 3. The output of the image display instruction is continued until the image selection switch 2e is turned off.

According to the inputted image display instruction, the controller 8a causes the display device 5 to display on the display panel 10 image data captured by using the cameras 4b and 4d of the image capture section 4 sent to the display panel through the image processing device 9. As illustrated in FIG. 1B, a rightward rear view image 18 thus displayed is disposed on a right side of the display panel 10. Further, the rightward rear view image 18 is displayed on the right side with respect to a driver of the automobile 1. The rightward rear view image 18 is preferably displayed in a mirror-reversed form in the present preferred embodiment.

Further, when the rightward rear view image 18 is displayed on the display panel 10, the image processing device 9 accordingly performs image processing to change a position of the gear status 12a, the thermometer 14a, and the fuel gauge 15a and to stop displaying the tachometer 13 on the display panel 10.

Thus, when the image selection switch 2e is turned on for a rightward check, the rightward rear view image 18 is displayed on the display panel 10. The rear area of the vehicle is checked via the rightward rear view image 18 thus displayed. Then, the blinker switch 2d is turned to a direction for making a right turn. When the blinker switch 2d is turned as such, right-turn blinker indication 17 is displayed on the display panel 10. Right-turn blinker indication 17 is displayed on the right of the speedometer 11. When the image selection switch 2e is automatically or manually turned off, the display of the rightward rear view image 18 disappears, so that the display panel 10 returns to a state shown in FIG. 1A.

In the following, a case in which the image selection switch 2e is turned on for a leftward check will be described. An image display instruction for a leftward check is outputted to the display device 5 from the image selection switch 2e through the control section 3.

In the display device 5, according to the inputted image display instruction, the controller 8a displays image data captured by using the cameras 4a and 4c of the image capture section 4 on the display panel 10 through the image processing device 9. As illustrated in FIG. 1C, a leftward rear view image 20 is disposed on the left side of the display panel 10. Further, the leftward rear view image 20 is displayed on the left side facing a driver of the automobile 1. It is to be noted that the leftward rear view image 20 of the present preferred embodiment is a display of a mirror-reversed image.

Further, on the display panel 10 with the leftward rear view image 20 displayed thereon, the navigation information 16 is cleared by way of image processing of the image processing device 9.

Thus, when the image selection switch 2e is turned on for a leftward check, the leftward rear view image 20 is displayed on the display panel 10. Turning on the blinker switch 2d for a left turn after checking a rear area according to the leftward rear view image 20 displays a left blinker indication 19 on the display panel 10. The left blinker indication 19 is displayed on the left side of the speedometer 11. When the image selection switch 2e is automatically or manually turned off, the display of the leftward rear view image 20 is cleared, so that the display panel 10 returns to the state shown in FIG. 1A.

As described above, the image for checking the rear area of the vehicle is displayed on the display panel 10 of the display device 5 of the automobile 1 only when necessary.

Further, in the automobile 1 of the present preferred embodiment, an image display instruction for checking a rear area is given not only by the image selection switch 2e but also, for example, by the blinker switch 2d.

Figure 1B:
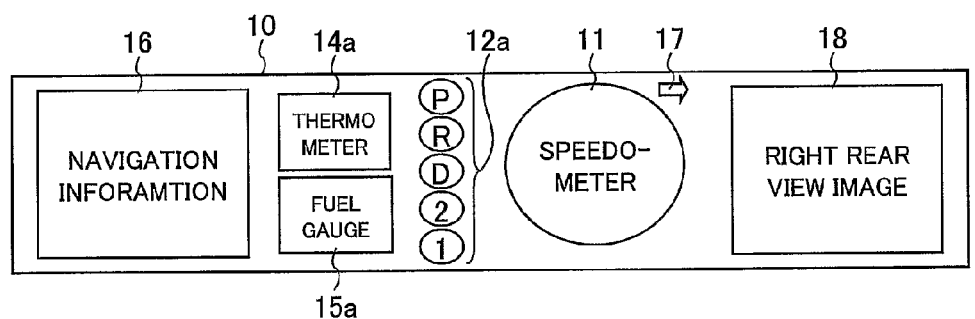
FIG. 1B is a plan view showing another display example.

That is, turning on the blinker switch 2d for a right turn causes the display panel 10 to display as shown in FIG. 1B, similarly to the case where the image selection switch 2e is turned on. Further, turning on the blinker switch 2d for a left turn causes the display panel 10 to display as shown in FIG. 1C, similarly to the case where the image selection switch 2e is turned on. Further, when the blinker switch 2d is automatically or manually turned off (i.e. returned to its normal position), the display panel 10 returns to the state shown in FIG. 1A.

Thus, the image display instruction for checking a rear area can also be inputted into the display device 5 according to an intention of the driver (user) of the automobile 1.

Further, the present invention is not limited to this. The image display instruction for checking a rear area may be arranged to be inputted into the display device 5 when a certain kind of signal is detected.

For example, the image display instruction for checking a rear area may be generated in the transmitter-receiver section 7, which receives information from the navigation information transmitting station 30. The transmitter-receiver section 7 outputs the image display instruction to the display device 5 through the control section 3.

For example, when a navigation system is used, a place of departure and a destination are inputted and the navigation information 16 including information such as a map of the present position is displayed on the display panel 10. For example, in case of traveling along an optimum route derived from the place of departure and the destination, a voice instruction saying for example, "Turn right at the next traffic light," is given to a driver when a right turn needs to be made at a next traffic light in a forward direction.

In the present preferred embodiment, the rightward-rear view image 18 shown in FIG. 1B is displayed on the display panel 10 when a right turn needs to be made at the next traffic signal in a forward direction. In case of a left turn, the leftward rear view image 20 shown in FIG. 1C is displayed on the display panel 10.

The rear view image may be displayed in association with navigation information, e.g., in this manner.

Further, for example, another preferred embodiment may be arranged so that when the sensor 6 detects an object around a vehicle, an image display instruction for checking a rear area is generated. Then, the sensor 6 outputs to the display device 5 through the control section 3 the image display instruction for checking a rear area.

Figure 1C:
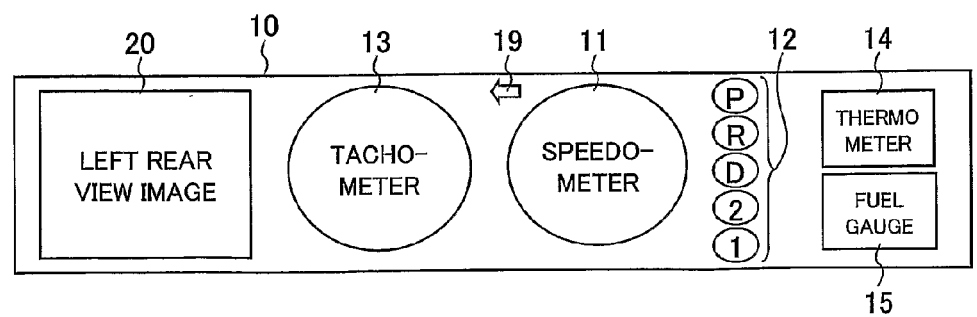
FIG. 1C is a plan view showing a further display example.

For example, the rightward rear view image 18 shown in FIG. 1B is displayed on the display panel 10 when the sensor 6 detects an object on the rightward rear of the automobile 1, and the leftward rear view image 20 shown in FIG. 1C is displayed on the display panel 10 when the sensor 6 detects an object on the leftward rear of the vehicle. Further, for example, another preferred embodiment may be arranged so that the sensor 6 performs a predetermined image process with respect to an image captured by the image capture section 4, so as to judge whether or not there is a two-wheeled vehicle around the vehicle. In this case, when a two-wheeled vehicle is detected on the right or left rear side of the vehicle, a rear view image is displayed accordingly on the display panel 10.

As described above, the display device 5 according to the present preferred embodiment preferably includes the controller 8a and the image processing device 9. The controller 8a causes the display panel 10 to display thereon an image for checking the rear of the vehicle upon receiving an image display instruction for checking the rear area of the vehicle, the image being captured by the image capture section 4. The image processing device 9 causes the image for checking the rear area of the vehicle to be displayed in a different manner according to whether the image is for checking the rightward rear area or the leftward rear area. With this arrangement, it is easy to check the rear area of the automobile 1, thereby making it easier to maneuver the automobile 1.

Driving becomes safer with this arrangement in which, in lieu of the instrument panel for displaying speed information (the speedometer 11) and the other information of the automobile 1, a display device having a wide panel (such as an FPD or other display device) is used for displaying driving information such as speed, number of engine revolutions, an amount of fuel, navigation information, and other information. Especially when the vehicle is to make a turn (e.g., to change lanes), a rear view image is displayed on the display device according to, e.g., turning of the blinker switch 2d. The rear view image is a rightward rear view image or a leftward rear view image depending on whether the vehicle is to make a right or left turn (for example, depending on whether the blinker switch 2d is turned in a direction for a right turn or in a direction for a left turn).

Further, when a rightward or leftward check is unnecessary, the display panel 10 does not display the rear view image but displays other information such as speed, current conditions of the vehicle (engine speed, an amount of fuel, etc.), and navigation information. With this arrangement, a large amount of information necessary for traveling to a destination is provided.

Further, the display of the rear view image is performed such that a rightward rear view image is displayed on the right side of the display panel 10 and a leftward rear view image is displayed on the left side of the display panel 10. This enables a driver to instantly sense and recognize whether the displayed rear view image is a rightward or leftward rear view image. Therefore, the driver can change lanes (or make a right or left turn) more safely.

Apart from the above arrangements, the present preferred embodiment may be arranged so that the rear view image is displayed such that it is displayed on the right side of the speedometer 11 if it is a rightward rear view image, and on the left side of the speedometer 11 if it is the leftward rear view image. In this arrangement, speed information, which is the most important information, is displayed at all times during driving but the rightward rear view image is displayed on the right side thereof when the vehicle is to move to a right lane (or to make a right turn) and the leftward rear view image is displayed on the left side thereof when the vehicle is to move to a left lane (or to make a left turn).

The image may be displayed in a mirror-reversed form. The image displayed in the mirror-reversed form is such that, as if looking at a side mirror a driver can recognize what is shown in the image. Thus, he does not feel a sense of confusion when looking at the image to recognize what is shown therein.

Further, the speedometer 11 may be displayed in front of the driver of the automobile 1 at all times during driving. By fixing the position at which the speedometer 11 is displayed, a misreading of speed by a driver can be prevented.

Further, the display device 5 according to the present preferred embodiment performs a display method for displaying an image in an onboard display device mounted on a vehicle, the display method including the steps of detecting an image display instruction, given to the onboard display device, for checking a rightward or leftward outside area of the vehicle; causing a screen of the onboard display device to start displaying an image upon detection of the image display instruction in the detecting step; and causing a manner in which the rightward outside view image is displayed to be different from a manner in which the leftward outside view image is displayed. Further, the display device 5 performs a display method of an onboard display device, mounted on a vehicle provided with one or more image capture devices capable of capturing images for checking a rightward and leftward rear areas, which can display the images checking the rightward and leftward rear areas within a screen, the display method including the steps of detecting an instruction for displaying a rightward outside view image for checking a rightward outside area of the vehicle or a leftward outside view image for checking a leftward outside area of the vehicle; and selecting and displaying either a rightward outside view image for checking a rightward outside area of the vehicle or a leftward outside view image for checking a leftward outside area of the vehicle according to a detection result in the detecting step. Accordingly, a program which causes a computer to perform the display method may be recorded in a recording medium so as to be read by the computer. The recording medium can be read by the computer to make it possible to achieve the foregoing display device. Alternatively, a recording medium may be created by using a program which causes a computer to function as the display control section and the image processing section of the onboard display device.

It is to be noted, in the foregoing preferred embodiment, that the frame shape of a display area (a rightward rear view image, a leftward rear view image) displayed on the display panel 10 is preferably an oblong shape, but is not limited to this.

The frame shape may be for example in the shape of a trapezoid, a polygon, a circle, an oval or any other shape. The frame shape may be varied according to a rightward or leftward checking of the image.

Figure 4A:
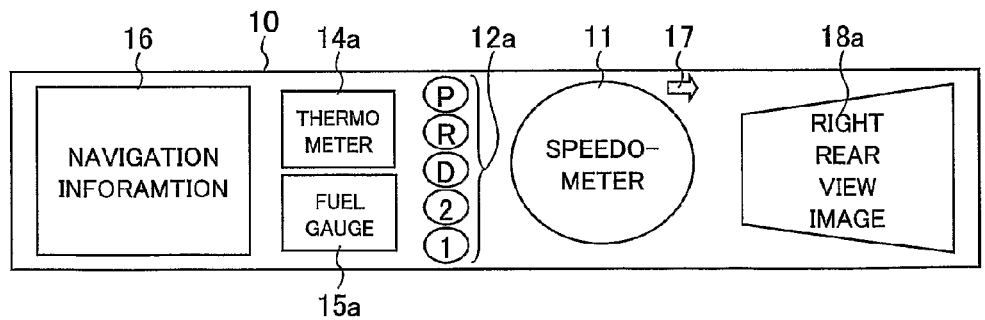
FIG. 4A is a plan view showing a display example according to another preferred embodiment of the display device.
Figure 4B:
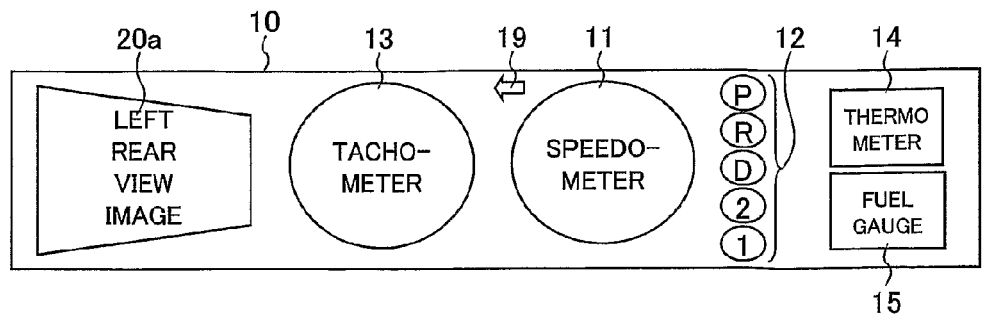
FIG. 4B is a plan view showing another display example.

FIGS. 4A and 4B are examples when a trapezoid is used as the frame shape. FIG. 4A shows a rightward rear view image 18a serving as a trapezoidal frame shape of the rightward rear view image 18 in the display manner shown in FIG. 1B. Further, FIG. 4B shows a leftward rear view image 20a serving as a trapezoidal frame shape of the leftward rear view image 20 in the display manner shown in FIG. 1C.

As illustrated in FIGS. 4A and 4B, the rightward rear view image 18a for a rightward check and the leftward rear view image 20a for a leftward check may have different frame shapes.

In the following, an image displayed in a display area in the case of FIGS. 1B and 1C and FIGS. 4A and 4B will be described in detail with reference to FIGS. 5A to 5D. Although only a rightward rear view image will be described here for the purpose of simplicity, the same applies to a leftward rear view image.

Figure 5A:
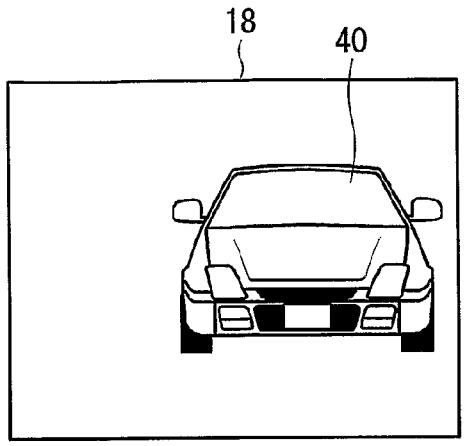
FIG. 5A is a plan view showing a portion of a display example of a display device.

In the beginning, FIG. 5A shows an example of the rightward rear view image 18 shown in FIG. 1B. The example shown in FIG. 5A is a reverse mirror display of an image, captured by the cameras 4b and 4d of the image capture section 4, of another automobile 40 traveling on a right rear side of the automobile 1.

Figure 5B:
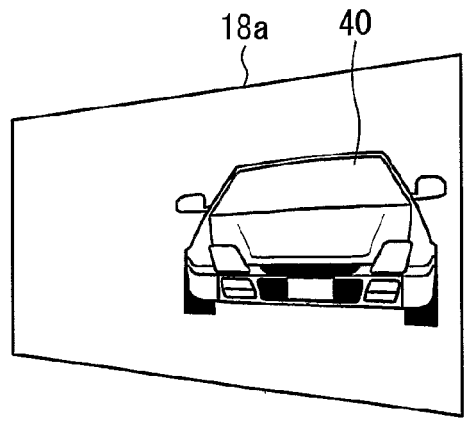
FIG. 5B is a plan view showing a portion of another display example of a display device.

Next, FIG. 5B shows, as the rightward rear view image 18a, an example of the rightward rear view image 18a shown in FIG. 4A. FIG. 5B is an example of a trapezoidal display of the image shown in FIG. 5A. The rightward rear view image 18a takes the shape of a trapezoid with its shorter side on a side closer to the automobile 1. This makes it possible to easily determine whether the automobile 40 is approaching the automobile 1 when the automobile 40 moves in the rightward rear view image 18a.

Figure 5C:
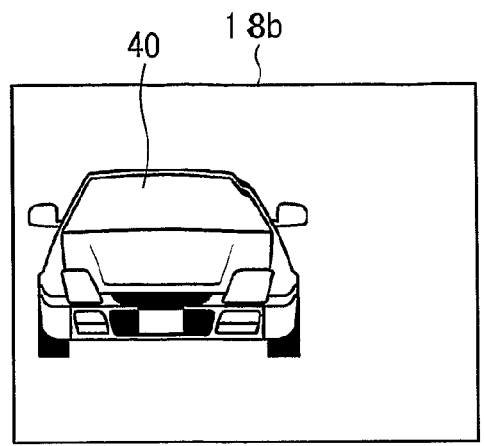
FIG. 5C is a plan view showing a portion of a further example of a display of the display device.

FIG. 5C shows, as a rightward rear view image 18b, an example in which the same image data as in FIG. 5A is displayed without being mirror-reversed. In case of using an oblong as a frame shape, as illustrated in FIGS. 5A and 5C, it is difficult to intuitively determine whether the image is mirror-reversed.

Figure 5D:
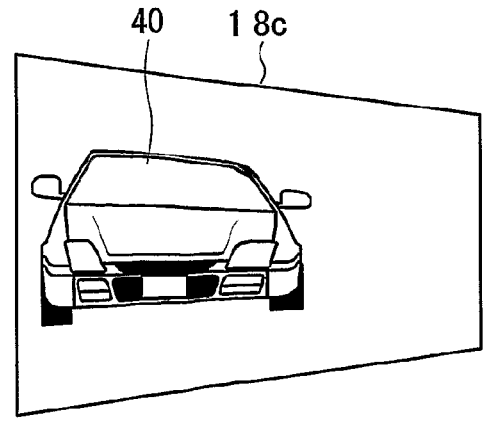
FIG. 5D is a plan view showing a portion of a further display example of a display device.

Accordingly, as illustrated in FIG. 5D, the frame shape takes the shape of a trapezoid. FIG. 5D shows a rightward rear view image 18c, which is a trapezoidal frame shape of the rightward rear view image 18b shown in FIG. 5C. In the display panel 10, the rightward rear view image 18c is displayed in the same position, for example, as the rightward rear view image 18 shown in FIG. 1B or the rightward rear view image 18a shown in FIG. 4A. This makes it possible to intuitively determine a display of a rightward rear view image by the rightward rear view image 18c. Further, because the automobile 1 is disposed on the shorter side of a trapezoidal display, it is possible to easily determine whether the automobile 40 is approaching the automobile 1.

Further, in the foregoing preferred embodiment, although the speedometer 11 is fixed as shown, for example, in FIGS. 1A to 1C, it is not limited to this. For example, as illustrated in FIGS. 6A to 6C, the speedometer 11 may be arranged so that it changes its position.

Figure 6A:
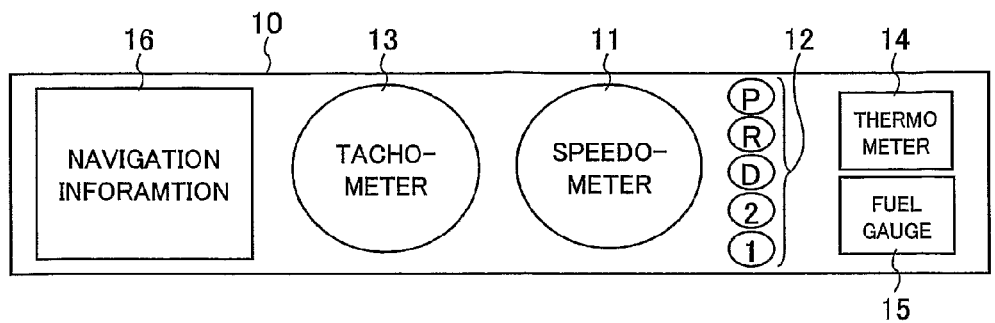
FIG. 6A is a plan view showing a display example according to another preferred embodiment of the display device.
Figure 6B:
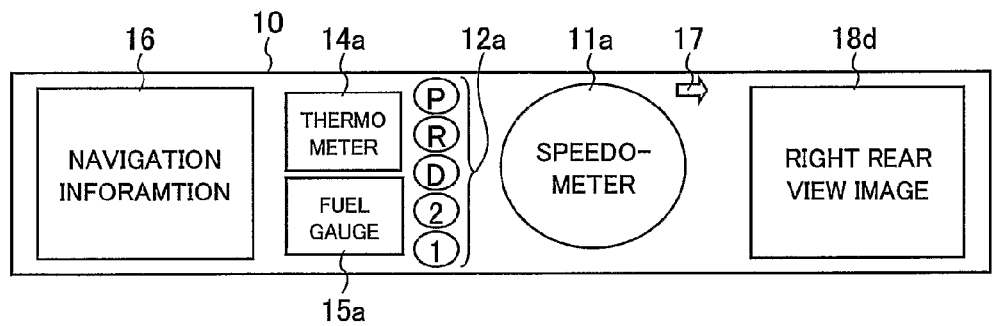
FIG. 6B is a plan view showing another display example.
Figure 6C:
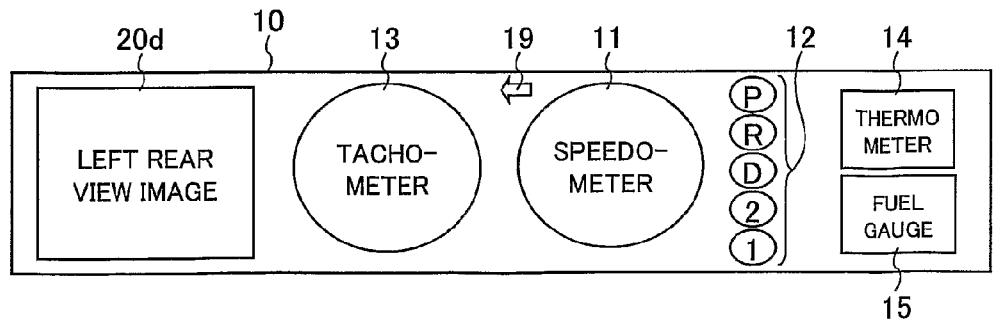
FIG. 6C is a plan view showing a further display example.

FIG. 6A shows the display panel 10 at the time of normal driving and FIG. 6B shows the display panel 10 displaying a rightward rear view image 18d according to an image display instruction for a rightward check. As illustrated in FIG. 6B, the speedometer 11 may change its position in association with a display of the rightward rear view image 18d. In this example, as illustrated in FIG. 6C, the speedometer 11 returns to its original position when a leftward rear view image 20d is displayed.

Thus, the speedometer 11 may be moved out of a position in front of a driver of the automobile 1. However, as illustrated in FIGS. 1A to 1C, fixing the speedometer 11 in front of the driver of the automobile 1 makes it easy for the driver to check speed and therefore contributes to safe driving.

The preferred embodiments being thus described, it should be noted that the preferred embodiments may be varied in many ways. Such variations are not to be regarded as a departure from the spirit and scope of the invention, and all such modifications that would be obvious to one skilled in the art are intended to be included within the scope of the following claims.

For example, the image processing device 9 may cause the rightward rear view image 18 to be displayed on the display panel 10 in a display manner different from that in which the leftward rear view image 20 is displayed, or may cause the leftward rear view image 20 to be displayed on the display panel 10 in a display manner different from that in which the rightward rear view image 18 is displayed. Further, the image processing device 9 may display the speedometer 11 of the automobile 1 in a fixed position even when displaying the rightward rear view image 18 or the leftward rear view image 20. Further, the image processing device 9 may cause the display of the speedometer 11 of the automobile 1 to be performed such that the speedometer 11 is displayed on a position of the display panel 10 which is in front of a driver driving the automobile 1.

Further, the image processing device 9 may cause a display area frame shape of the rightward rear view image 18 to be displayed on the display panel in a display manner different from that in which a display area frame shape of the leftward rear view image 20 is displayed, or may cause a display area frame shape of the leftward rear view image 20 to be displayed on the display panel in a display manner different from that in which a display area frame shape of the rightward rear view image 18 is displayed. In other words, the image processing device 9 may cause the display panel 10 to display the rightward rear view image 18 whose display area frame shape is different from that of the leftward rear view image 20, or the leftward rear view image 20 whose display area frame shape is different from that of the rightward rear view image 18. Further, the image processing device 9 may mirror-reverse the rightward rear view image 18 or the leftward rear view image 20 captured by the image capture section 4, and cause the display panel 19 to display the rightward rear view image 18 or the leftward rear view image 20 thus mirror-reversed.

Further, the controller 8a may be arranged so that it receives a display instruction signal for a rear view image outputted from the automobile 1 and then causes the display panel 10 to display either of the rightward rear view image 18 and the leftward rear view image 20 in accordance with a type of the instruction signal thus received; the rightward rear view image 18 and the leftward rear view image 20 captured by the image capture section 4. Further, the controller 8a may be arranged so that it receives an image display instruction signal from the blinker switch 2d mounted on the automobile 1. In this arrangement, the controller 8a may cause the display panel 10 to display either of the rightward rear view image 18 and the leftward rear view image 20 in accordance with a type of the image display instruction signal outputted from the blinker switch 2d.

The display device 5 may be a display device 5 mounted on an automobile 1 for displaying on a display panel 10 of the display device 5 image data inputted from an image capture section 4, which captures an image outside of the automobile 1, the display device 5 including a controller 8a which, upon receipt of an image display instruction for checking a rear area of the vehicle causes the display panel 10 of the display device 5 to start displaying either a rightward rear view image 18 or a leftward rear view image 20 based on a type of the instruction signal so received, the image display instruction being outputted from the automobile 1, and the rightward rear view image 18 and the leftward rear view image 20 being captured by the image capture section 4; and an image processing device 9 for causing the display of the rightward rear view image 18 and the leftward rear view image 20 to be performed such that a manner in which the rightward rear view image 18 is displayed is caused to be different from a manner in which the leftward rear view image 20 is displayed.

The display device 5 may be a display device 5 mounted on an automobile 1 for displaying on a display panel 10 of the display device 5 image data inputted from an image capture section 4, which captures an image outside of the automobile 1, the display device 5 including a controller 8a which, upon receipt of an image display instruction for checking a rear area of the vehicle, causes the display panel 10 of the display device 5 to start displaying either a rightward rear view image 18 or a leftward rear view image 20 in accordance with a type of the instruction signal so received, the image display instruction being outputted from the automobile 1, and the rightward rear view image 18 and the leftward rear view image 20 being captured by the image capture section 4; and an image processing section for causing a display layout including (a1) an image indicating information on the vehicle and (a2) the rightward rear view image 18 to be displayed in a display manner different from that in which a display layout including (b1) an image indicating information on (b2) the vehicle and the leftward rear view image 20.

Further, the rightward rear view image 18 can be described as an image which displays an area including a right side area and a rightward rear area of the automobile 1 with respect to the forward direction D thereof. That is, the rightward rear view image 18 (image for checking a rightward rear) can be described as an image for displaying a rightward surrounding area of a vehicle. Meanwhile, the leftward rear view image 20 can be described as an image which displays an area including a left side area and a leftward rear area of the automobile 1 with respect to the forward direction D thereof. That is, the leftward rear view image 20 (image for checking a leftward rear) can be expressed as an image for displaying a leftward surrounding area of a vehicle.

Further, the image processing device 9 may cause the display of the rightward rear view image 18 and the leftward rear view image 20 to be performed such that a speedometer 11 of the automobile 1 is displayed substantially at the same position on the display panel 10 when the rightward outside view area is displayed and when the leftward outside view area is displayed.

As described above, in addition to the foregoing arrangement, the onboard display device according to another preferred embodiment may be arranged so that the image processing section causes the display of the rightward outside view image and the leftward outside view image to be performed such that a position on the screen at which the rightward outside view image is displayed is different from a position on the screen at which the leftward outside view image is displayed.

If a display position in which an image for checking a rightward outside area of a vehicle is displayed on a screen is caused to be different from that in which an image for checking a leftward outside area of the vehicle is displayed on the screen, the right and the left are not confused. This ensures the rear areas are checked. Further, this facilitates an intuitive determination, i.e., makes it easier for a driver to at a glance determine a meaning of the image.

In addition to the foregoing arrangements, the onboard display device according to another preferred embodiment may be arranged so that the image processing section causes the display of the rightward outside view image and the leftward outside view image to be performed such that the position on the screen at which the rightward outside view image is displayed is rightward with respect to a position in front of a driver, and the position on the screen at which the leftward outside view image is displayed is leftward with respect to the position in front of the driver.

Thus, if an image to be displayed and a position in which the image is to be displayed are associated, an intuitive determination of the meaning of the image is facilitated.

In addition to the foregoing arrangements, the onboard display device according to another preferred embodiment may be arranged so that the image processing section causes the display of the rightward outside view image and the leftward outside view image to be performed such that a speedometer of the vehicle is displayed substantially at the same position on the screen when the rightward outside view area is displayed and when the leftward outside view area is displayed.

Thus, if the position of the speedometer is not changed but is displayed in a predetermined position, it becomes easy for a driver to check the speed.

In addition to the foregoing arrangements, the onboard display device according to another preferred embodiment may be arranged so that the image processing section causes the display of the speedometer of the vehicle such that the speedometer is displayed in front of the driver of the vehicle.

Thus, if the speedometer is placed in front of a driver, a speed check necessary during driving is facilitated. If the position of the speedometer is fixed, it is possible to avoid confusing the driver and allow the driver to check the speed certainly, thereby enabling safe driving.

In addition to the foregoing arrangements, the onboard display device according to another preferred embodiment may be arranged so that the image processing device causes the display of the rightward outside view image and the leftward outside view image to be performed such that the rightward outside view image and the leftward outside view image are displayed in different frame shapes of a display area on the screen.

If a suitable frame shape makes it possible to judge from the frame shape whether an image is a right or left rear view image, accurate checking of the rear image is facilitated. The frame shape, for example, may be the shape of a trapezoid, whose right or left side is shorter than the opposite side. Further, the display manner is not limited to this. For example, a frame color may be changed.

In addition to the foregoing arrangements, the onboard display device according to another preferred embodiment may be arranged so that the image processing section mirror-reverses an image produced by the image capture section and so as to cause the image to be displayed in a mirror-reversed form on the screen.

In this case, a mirror reversal means that the right and the left are reversed. Because a mirror-reversed image has the same content as an image displayed in a mirror, there never occurs a sense of confusion as compared with a check by way of a conventional mirror.

Further, a mirror reversal and a transformation of the frame shape of the display area may be combined. For example, when a rightward rear screen is caused to perform a display, a left side of the frame is shortened. On the other hand, for example, when a left rear screen is caused to perform a display, a right side of the frame is shortened. With this arrangement, it is possible to indicate to the driver that in the screen of the image the vehicle is positioned on the shorter and narrower side of the screen.

Further, the image in the mirror-reversed form may be displayed in a frame shape different from that of the image not in the mirror-reversed form. For example, the frame shape may take the shape of a trapezoid during the mirror-reversed form and take the shape of a normal oblong when not mirror-reversed. This makes it possible to instantly judge whether an image is reversed, so that there is no danger of a misjudgment.

In addition to the foregoing arrangements, the onboard display device according to another preferred embodiment may be arranged so that the display control section receives an image display instruction from a direction indicating device mounted on the vehicle, the direction indicating device used for indicating that the vehicle is going to make a right turn or a left turn.

The direction indicating device is preferably, for example, a blinker mounted on a vehicle. When the direction indicating device is used to make a right turn or a left turn, for example, at the time of changing lanes, a rightward rear view image or a leftward rear view image is displayed according to an image display instruction operating together therewith, thereby making it easy to check a rear area of the vehicle.

The display device of the foregoing arrangement may be a display device mounted on a transportation vehicle (the term "transportation vehicle" encompasses any vehicle for traveling regardless of whether it carries passengers or goods), which displays on a screen an image in such a manner that the image is displayed in a different display manner according to whether a right-turn indication instruction or a left-turn indication instruction is given to a direction indicator (i.e., an indication instruction is given to a right-turn indicator or a left-turn indicator), the transportation vehicle including the direction indicator and a camera in addition to the display device, the image captured by the camera, and the direction indicator for indicating that the transportation vehicle is going to make a right turn or a left turn.

In addition to the foregoing arrangements, the onboard display device according to another preferred embodiment may be arranged so that the display control section receives an image display instruction from a sensor mounted on the vehicle, the sensor detecting whether an outside object is present or absent around the vehicle.

In addition to the foregoing arrangements, the sensor mounted on the vehicle outputs an image display instruction to the display device upon detection of an object around the vehicle. For example, the sensor detects the presence or absence of an object in a predetermined area in the right rear of the vehicle. The sensor outputs an image display instruction upon detection of a two-wheeled vehicle approaching from the right rear into a predetermined distance. The same is true for the left rear. For example, another arrangement may be utilized in which a specific object such as a two-wheeled vehicle is abstracted and detected by way of an image capture device and a predetermined image processing (image abstraction device). An image display device displays a rear view image according to an image display instruction that is inputted, thereby making it easy to check the rear.

Further, the display device of the foregoing arrangement automatically displays an image of an object existing in a predetermined area in the rear (e.g., in a predetermined area in the right rear) when a steering wheel has been turned to make a lane change without turning on the direction indicating device. Therefore, danger can be prevented even when a lane change has been made without noticing a two-wheeled vehicle approaching from the rear.

In addition to the foregoing arrangements, the onboard display device according to another preferred embodiment may be arranged so that the display control device receives an image display instruction from a navigation information transmitting and receiving section mounted on the vehicle, the navigation information transmitting and receiving section obtaining information on a position of the vehicle, the information sent from a navigation information transmitting station.

Here, when a navigation system is used, an optimum route is searched for and inputted according to a place of departure of the vehicle and a destination, and the display device is caused to display navigation information according to a present position of the vehicle. The navigation information transmitting and receiving section mounted on the vehicle outputs navigation information sent from the navigation information transmitting station to the display device. The display device displays the navigation information on the screen.

For example, when a right turn is made at the next traffic signal, the navigation information transmitting and receiving section outputs an image display instruction for a rightward rear view image as well as a guidance voice so as to cause the display device to display the rightward rear view image, instead of only a guidance voice saying, "Turn right at the next traffic signal." The same applies to a left turn. Thus, an image may be displayed in connection with the navigation system.

In addition to the foregoing arrangements, the onboard display device according to another preferred embodiment may be arranged so as to include an input section for adjusting and controlling the manner in which the image is displayed.

The input section functions as a user interface of the display device. The display device can switch over frames and whether mirror reversing of the image is carried out, according to a user's instruction received by the input section.

In order to solve the foregoing problems, a vehicle according to a preferred embodiment may be arranged so as to include a display device according to any of the above preferred embodiments.

The display device can make it easy to check the outside around the vehicle, thereby making it easier to drive the vehicle.

In addition to the foregoing arrangements, a vehicle according to another preferred embodiment may be arranged so as to include a rightward-and-leftward check switch for outputting to the onboard display device an image display instruction for instructing to display the rightward outside view image or the leftward outside view image.

Thus, the vehicle may include the rightward-and-leftward check switch for switching an image display of the display device, so that instead of a direction indicating device such as a so-called blinker, the switch may be used to switch the image or to start/stop displaying of the image. The rightward-and-leftward check switch can be provided near a steering wheel for the convenience in operating the vehicle.

When the right or the left is selected by turning on the rightward-and-leftward check switch of the vehicle, a rear state can be checked without turning on the direction indicating device. Therefore, before the indication of a right turn or a left turn by the direction indicating device, a rear state can be checked by looking at the display device in front of a driver without looking at a mirror or the like. Because the direction indicating device is turned on after a rear state is checked, a traveling vehicle in the rear does not get confused, thereby contributing to traffic safety. Further, although the display device does not always display a rear view image, a display manner of the display device can be suitably controlled.

Further, the rightward-and-leftward check switch is not limited to the arrangement in which it is provided in a maneuvering section of the vehicle, but may be detachably provided as an auxiliary switch of the display device.

The onboard display device may be a computer. In this case, an image display program which causes a computer to function as the respective sections of the onboard display device, and a computer-readable recording medium in which the image display program is recorded also falls within the scope of the present invention.

An onboard display device according to the preferred embodiments makes it easier to drive a vehicle, and therefore can be mounted, for example, on an automobile.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. An onboard display device for displaying information concerning a vehicle condition and image data inputted by an image capture section which captures an image around a vehicle, comprising:

a display control section arranged to cause a display screen of the onboard display device which display screen is longer in width than in height (i) to concurrently display an additional image such as a navigation image and the information concerning the vehicle condition in a normal running mode and (ii) to display a rightward rear view image or a leftward rear view image captured by the image capture section only when an image display instruction for checking a rightward rear view or an image display instruction for checking a leftward rear view is supplied from the vehicle; and an image processing section arranged (i) to cause a speedometer out of the information concerning the vehicle condition to be fixedly displayed in front of a driver, (ii) to cause the leftward rear view image out of the image data inputted by the image capture section to be displayed on a left side of the speedometer when the image display instruction for checking the leftward rear view is received, and (iii) to cause the rightward rear view image out of the image data inputted by the image capture section to be displayed on a right side of the speedometer when the image display instruction for checking the rightward rear view is received, the leftward rear view image and the rightward rear view image not being concurrently displayed; wherein the image processing section is arranged to display the leftward rear view image or the rightward rear view image in a trapezoidal shape; and the leftward rear view image or the rightward rear view image has a trapezoidal shape whose shorter side is located on a side closer to the vehicle.

2. The onboard display device according to claim 1, wherein the image processing section mirror-reverses an image produced by the image capture section and causes the rightward rear view image and the leftward rear view image to be displayed in a mirror-reversed form on the display screen.

3. The onboard display device according to claim 1, wherein the display control section is arranged to receive an image display instruction from a direction indicating device of the vehicle, the direction indicating device indicating that the vehicle is going to make a right turn or a left turn.

4. The on board display device according to claim 1, wherein the display control section is arranged to receive an image display instruction from a navigation information transmitting section of the vehicle, the navigation information transmitting section obtaining information on a position of the vehicle, the information being sent from a navigation information transmitting station.

5. The onboard display device according to claim 1, wherein the display control section is arranged to receive an image display instruction from a sensor of the vehicle which detects whether an outside object is present or absent around the vehicle.

6. The onboard display device according to claim 1, wherein the onboard display device is a liquid crystal display device.

7. The onboard display device according to claim 1, wherein the onboard display device is an organic or inorganic EL display device.

8. A vehicle comprising the onboard display device according to claim 1.

9. The vehicle according to claim 8, further comprising:
a switch arranged to output to the onboard display device an image display instruction to display the rightward rear view image or the leftward rear view image.

10. An onboard display device for displaying information concerning a vehicle condition and image data inputted by an image capture section which captures an image around a vehicle, comprising:
a display control section arranged to cause a display screen of the onboard display device which display screen is longer in width than in height (i) to concurrently display an additional image such as a navigation image and the information concerning the vehicle condition in a normal running mode and (ii) to display a rightward rear view image or a leftward rear view image captured by the image capture section only when an image display instruction for checking a rightward rear view or an image display instruction for checking a leftward rear view is supplied from the vehicle; and
an image processing section arranged (i) to cause a speedometer out of the information concerning the vehicle condition to be fixedly displayed in front of a driver, (ii) to cause the leftward rear view image out of the image data inputted by the image capture section to be displayed on a left side of the speedometer when the image display instruction for checking the leftward rear view is received, and (iii) to cause the rightward rear view image out of the image data inputted by the image capture section to be displayed on a right side of the speedometer when the image display instruction for checking the rightward rear view is received, the leftward rear view image and the rightward rear view image not being concurrently displayed; wherein
the image processing section is arranged to display, from left to right, the navigation image, a tachometer, the speedometer, a gear status, a thermometer, and a fuel gauge as the information concerning the vehicle condition in the normal running mode, in response to receipt of the image display instruction for checking the rightward rear view, the image processing section is arranged to display the rightward rear view image on a right side of the display screen and to display the thermometer and the fuel gauge in replacement of the tachometer, and in response to receipt of the image display instruction for checking the leftward rear view, the image processing section is arranged to display the leftward rear view image on a left side of the display screen in replacement of the navigation image.

\* \* \* \* \*